United States Patent
Lu et al.

(10) Patent No.: US 9,112,545 B2
(45) Date of Patent: Aug. 18, 2015

(54) RESONANT-CIRCUIT STRUCTURE

(76) Inventors: Gui-Yang Lu, Upland, CA (US);
Michael F Cruz, Corona, CA (US);
Peter Troesch, Beverly Hills, CA (US)

( * ) Notice: Subject to any disclaimer, the term of this patent is extended or adjusted under 35 U.S.C. 154(b) by 1829 days.

(21) Appl. No.: 12/367,999

(22) Filed: Feb. 9, 2009

(65) Prior Publication Data

US 2010/0201495 A1    Aug. 12, 2010

(51) Int. Cl.
*H04B 7/00* (2006.01)
*H04B 5/02* (2006.01)
*H04B 5/00* (2006.01)

(52) U.S. Cl.
CPC ........... *H04B 5/02* (2013.01); *H04B 5/0062* (2013.01); *H04B 5/0075* (2013.01)

(58) Field of Classification Search
CPC ....... H04B 5/02; H04B 5/0062; H04B 5/0075
USPC ............... 340/572.5, 572.7, 572.8; 343/873; 235/384
See application file for complete search history.

(56) References Cited

U.S. PATENT DOCUMENTS

| | | | |
|---|---|---|---|
| 2002/0036569 A1* | 3/2002 | Martin | 340/573.1 |
| 2004/0082296 A1* | 4/2004 | Twitchell, Jr. | 455/41.2 |
| 2004/0217867 A1* | 11/2004 | Bridgelall et al. | 340/572.8 |
| 2005/0184871 A1* | 8/2005 | Coste | 340/568.2 |
| 2006/0209060 A1* | 9/2006 | Tanada et al. | 345/211 |
| 2006/0220829 A1* | 10/2006 | Johnson | 340/505 |
| 2007/0008140 A1* | 1/2007 | Saarisalo et al. | 340/572.7 |
| 2007/0096915 A1* | 5/2007 | Forster et al. | 340/572.3 |
| 2007/0290846 A1* | 12/2007 | Schilling et al. | 340/572.1 |
| 2008/0211676 A1* | 9/2008 | Commagnac et al. | 340/572.8 |
| 2008/0224831 A1* | 9/2008 | Arai et al. | 340/10.51 |
| 2009/0051491 A1* | 2/2009 | Lu et al. | 340/10.1 |
| 2009/0303003 A1* | 12/2009 | Pritchard et al. | 340/10.1 |

* cited by examiner

*Primary Examiner* — Andrew Bee
(74) *Attorney, Agent, or Firm* — Robert E. Malm

(57) ABSTRACT

The invention is a resonant-circuit structure for enhancing the interrogation range of a radio-frequency identification system. The resonant circuit structure consists of a coil assembly and a capacitor connected in parallel with a resonance frequency equal to the frequency of the interrogating signal of the radio-frequency identification system with which the resonant circuit structure is to operate. The coil assembly and the capacitor are embedded in a structure which provides physical support for the coil assembly and the capacitor and access to a region near the coil assembly.

1 Claim, 4 Drawing Sheets

RESONANT-CIRCUIT STRUCTURE

CROSS-REFERENCE TO RELATED APPLICATIONS (NOT APPLICABLE)

STATEMENT REGARDING FEDERALLY-SPONSORED RESEARCH AND DEVELOPMENT (NOT APPLICABLE)

REFERENCE TO SEQUENCE LISTING, A TABLE, OR A COMPUTER PROGRAM LISTING COMPACT DISC APPENDIX (NOT APPLICABLE)

BACKGROUND OF THE INVENTION

This invention relates to cooperative identification systems in which the identifying agency and the object to be identified cooperate in the identification process according to a prearranged scheme. More specifically, the invention relates to systems consisting generically of an interrogator (or "reader") inductively coupled to a transponder (or "tag") where the reader is associated with the identifying agency and the tag is associated with the object to be identified.

Such systems are being used or have the potential of being used for identifying fish, birds, animals, or inanimate objects such as credit cards. Some of the more interesting applications involve objects of small size which means that the transponder must be minute. In many cases it is desirable to permanently attach the tag to the object which means implantation of the device in the tissues of living things and somewhere beneath the surfaces of inanimate objects.

In most cases, implantation of the tag within the object forecloses the use of conventional power sources for powering the tag. Sunlight will usually not penetrate the surface of the object. Chemical sources such as batteries wear out and cannot easily be replaced. Radioactive sources might present unacceptable risks to the object subject to identification.

One approach to powering a tag that has been successfully practiced for many years is to supply the tag with power from the reader by means of an alternating magnetic field generated by the reader. This approach results in a small, highly-reliable tag of indefinite life and is currently the approach of choice.

For many applications, convenience and utility dictate that the reader be hand-portable which translates into the use of batteries to power the unit. However, the size and weight of batteries having the requisite capacity to perform the identification function at reasonable ranges without interruption challenge the very concept of hand-portability. The twin goals of ease of use and system performance have been the subject of uneasy compromise in the past. There is a need to harness the recent advances in technology to the design of energy efficient systems in order to realize the full potential of identification systems based on inductive coupling.

The range of operation of radio-frequency identification systems tends to be limited for portable readers because of power limitations. Ways of increasing operational ranges without requiring increased power resources would be welcomed by users of the equipment.

BRIEF SUMMARY OF THE INVENTION

The invention is a resonant-circuit structure for enhancing the interrogation range of a radio-frequency identification system. The resonant circuit structure consists of a coil assembly and a capacitor connected in parallel with a resonance frequency equal to the frequency of the interrogating signal of the radio-frequency identification system with which the resonant circuit structure is to operate. The coil assembly and the capacitor are embedded in a structure which provides physical support for the coil assembly and the capacitor and access by a tag to a region near to the coil assembly.

DETAILED DESCRIPTION OF THE INVENTION

Figure 1:
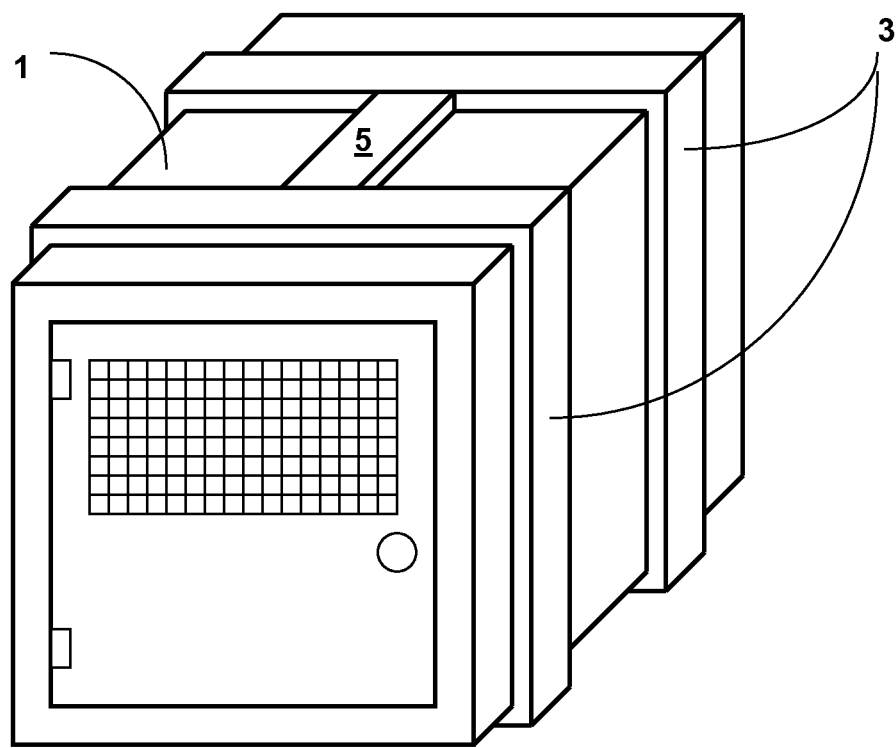
FIG. 1 is an embodiment of the invention wherein the resonant-circuit structure is a pet carrier for transporting pets.

The resonant-circuit structure provides a means for obtaining an increased range for a reader's successful interrogation of a tag. A pet-carrier embodiment of the invention is shown in FIG. 1. It consists of pet carrier 1 with coil-assembly structure 3 consisting of two coils embedded in a Helmholtz arrangement encircling pet carrier 1 and capacitor enclosure 5 containing a capacitor. The two coils are connected in series and the series combination is connected in parallel with the capacitor.

Figure 2:
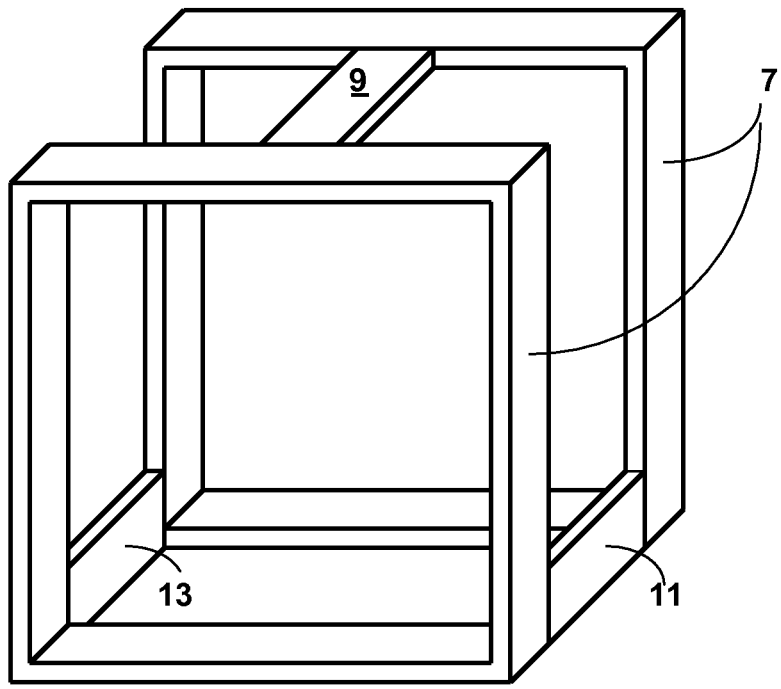
FIG. 2 is an embodiment of the invention wherein the resonant-circuit structure permits pets to pass through the structure.

The coils and capacitor constitute a resonant circuit with a resonance frequency equal to the frequency of the signal that a reader uses to interrogate a tag in a radio-frequency identification system. The coil assembly may be a single coil, multiple coils sharing a common axis, multiple coils having different axes, or one or more solenoid-wound coils having a common axis Another embodiment of the invention is shown in FIG. 2 wherein the resonant-circuit structure consists of coil-assembly structure 7 containing two coils and capacitor enclosure 9 containing a capacitor similar to the corresponding structures of FIG. 1. Structural rigidity is provided by support members 11 and 13.

An experimental model of a resonant circuit having the configuration shown in FIG. 1 was tested with two 9-inch by 12-inch rectangular coils spaced 6 inches apart and wound with Litz wire (44 gauge strands, 20 equivalent gauge) with 22 turns on one coil and 20 turns on the other. The inductance of coil assembly 7 was 856 µH and the capacitance of capacitor 9 was 1.893 nF resulting in a resonance frequency of approximately 125 kHz. A commercially-available reader and tag were used in testing the resonant-circuit structure.

The reader was able to successfully interrogate the tag at a maximum range of 14 inches without the resonant-circuit structure. The reader was able to successfully interrogate the tag at a range of 22 inches when the tag was placed in the resonant-circuit structure within the region bounded by the two coils.

Figure 3:
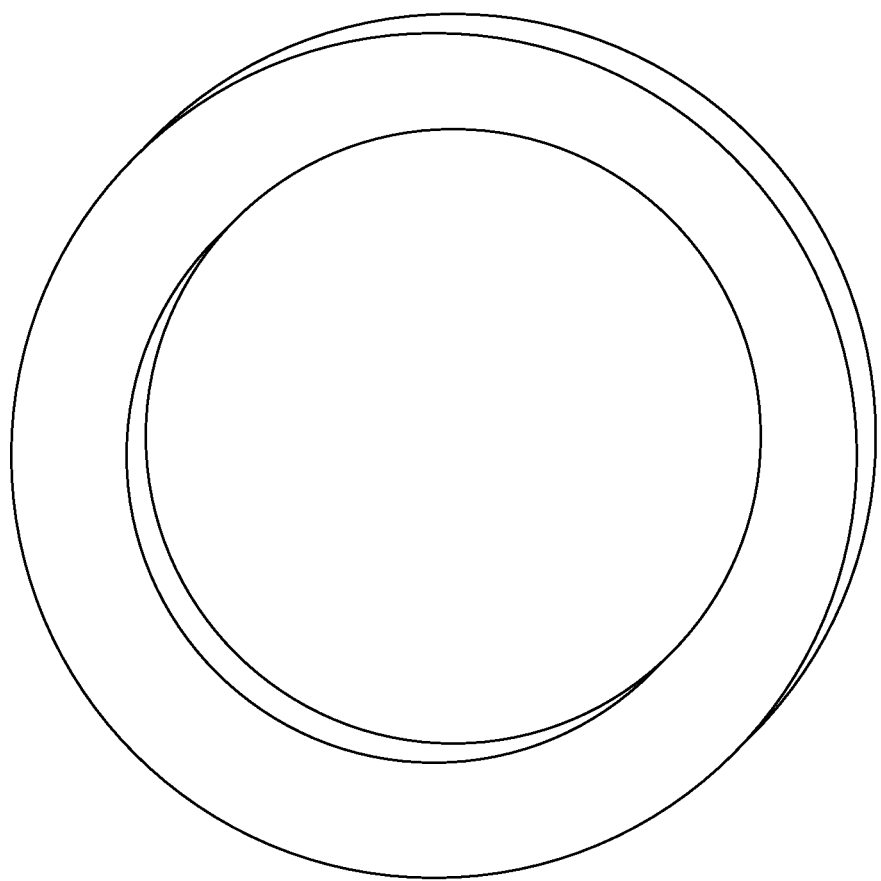
FIG. 3 is a portable embodiment of the invention wherein the resonant-circuit structure is hand carriable.

A simpler embodiment of the invention is shown in FIG. 3 which is a resonant-circuit structure consisting of a single coil connected in parallel with a capacitor and embedded in a plastic toroid. This structure has the advantage of portability whereby the structure can be held with one hand near an object to be interrogated with a reader held in the other hand.

Figure 4:
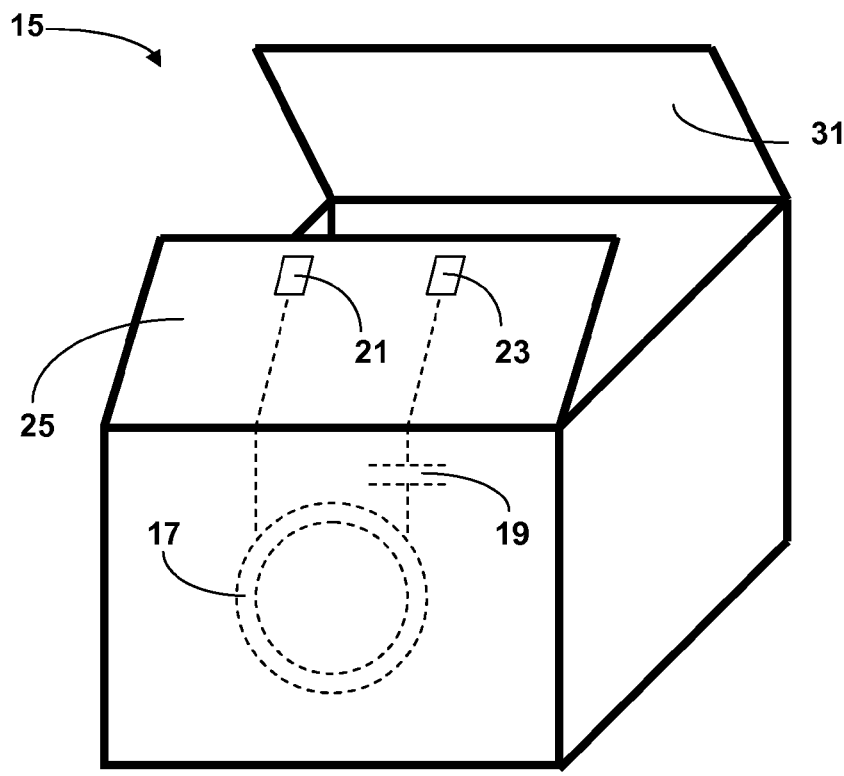
FIG. 4 is an embodiment of the invention in the form of a shipping container with a provision for detecting tampering.
Figure 5:
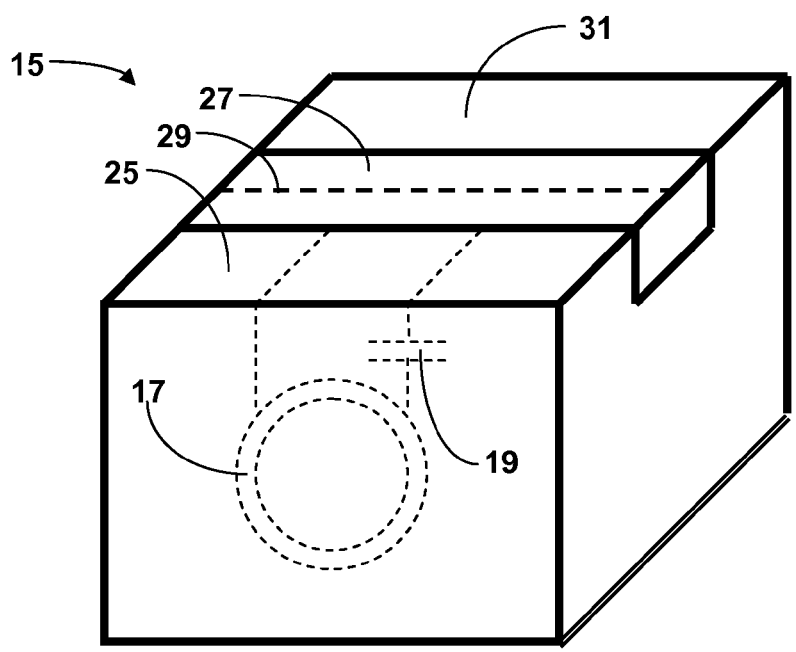
FIG. 5 is the shipping container of FIG. 4 sealed and ready for transport.

Another embodiment of the invention is shown in FIGS. 4 and 5 where the resonant-circuit structure is a shipping container 15 wherein the coil 17 and capacitor 19, connected in series, are embedded in one of the sides of container 15 and connected to conducting pads 21 and 23 near the edge of one of the container flaps 25. Container 15 is sealed with adhesive tape 27 which bridges the junction 29 of the two container flaps 25 and 31.

Figure 6:
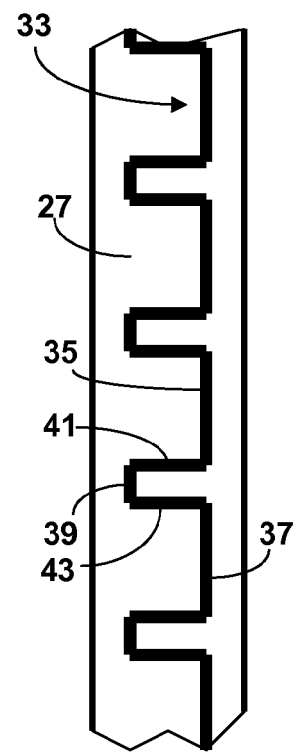
FIG. 6 shows the underside of the tape used to seal the shipping container of FIG. 4.

The underside of tape 27 is shown in FIG. 6. Tape 27 incorporates printed conductor 33 coated with a conducting adhesive. When tape 27 is applied face-down on container 15 as shown in FIG. 5, conducting segment 35 connects to pad 21 and conducting segment 37 connects to pad 23. Conducting segments 41 and 43 cross over junction 29 to flap 31. This arrangement permits the addressee of the shipping container to determine if the container had been opened enroute by attempting to read the tag inside the unopened container. If the addressee is unsuccessful in reading the tag, the resonant circuit has been disabled, presumably by someone opening the package en route by cutting the tape along junction 29 and unknowingly cutting through conducting segments 41 and 43.

Figure 7:
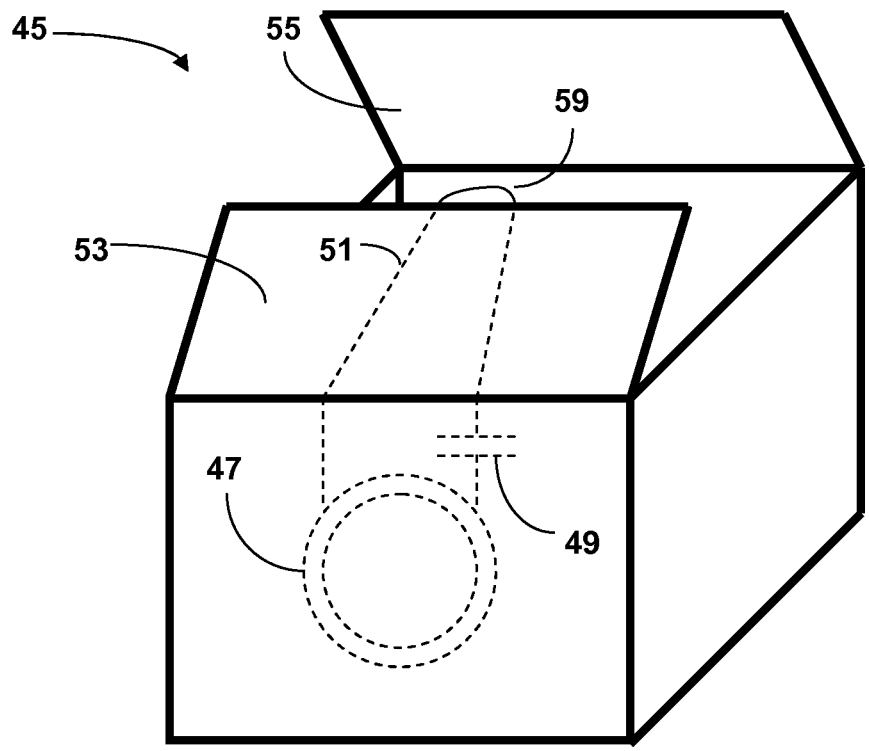
FIG. 7 is an embodiment of the invention in the form of a shipping container with a provision for detecting tampering..
Figure 8:
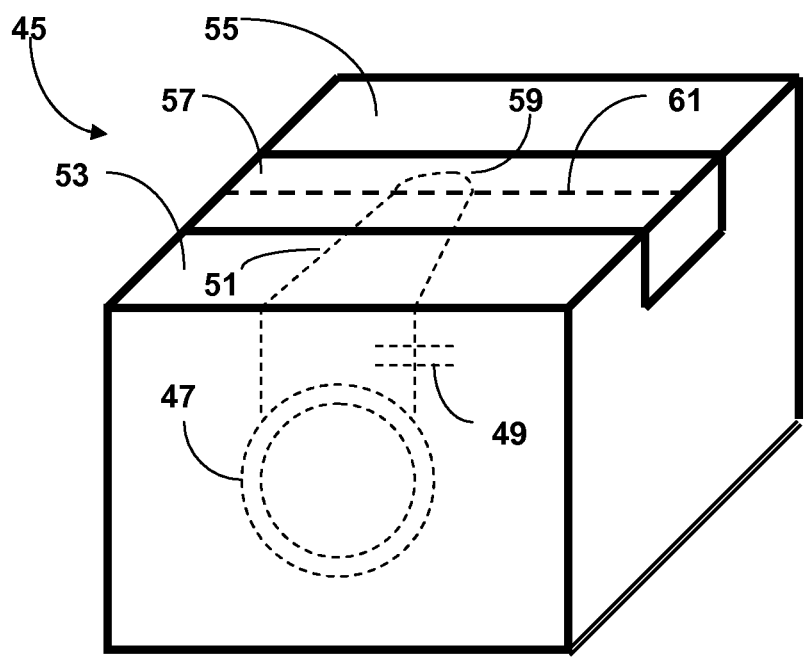
FIG. 8 is the shipping container of FIG. 7 sealed and ready for transport.

The embodiment of FIGS. 7 and 8 illustrates another tampeing-detectable version of the resonant-circuit structure in the context of shipping container 45. A resonant-circuit structure similar to the one shown in FIG. 3 and containing a coil 47 and capacitor 49 is attached internally to one of the sides of container 45. Several turns 51 of coil 47 remain outside the resonant-circuit structure and are shaped and attached to container 45 as shown in the figures with a portion extending beyond the junction edge of container flap 53.

The object to be shipped is placed in container 45 and the container flaps 53 and 55 are folded down in such a way that loop 59 of coil 47 is on top of flap 55. Container 45 is sealed with tape 57 which covers flap junction 61 and loop 59.

This arrangement also permits the addressee of the shipping container to determine if the container had been opened en route by attempting to read the tag inside the unopened container. If the addressee is unsuccessful in reading the tag, the resonant circuit has presumably been disabled by someone tampering with the package en route by cutting the tape along junction 29 and unknowingly cutting through the wire constituting loop 59.

What is claimed is:

1. A resonant-circuit structure for enhancing the interrogation range of a radio-frequency identification system, the resonant circuit structure comprising a resonant circuit consisting of a coil assembly and a capacitor connected in parallel with a resonance frequency equal to the frequency of the interrogating signal of the radio-frequency identification system with which the resonant circuit structure is to operate, the coil assembly and the capacitor being embedded in a structure which provides physical support for the coil assembly and the capacitor and access to a tag associated with an object to be interrogated, the resonant circuit structure being separate and distinct from the radio-frequency identification system, none of the current flowing within the resonant circuit embedded in the resonant circuit structure being diverted to power other devices, there being no other built-in power sources; wherein containment of or a passageway for an object having a tag to be interrogated is provided between the coils of the coil assembly.

* * * * *